July 26, 1949.   J. V. MARINER   2,477,134
EDUCATIONAL DEVICE
Filed Aug. 13, 1945
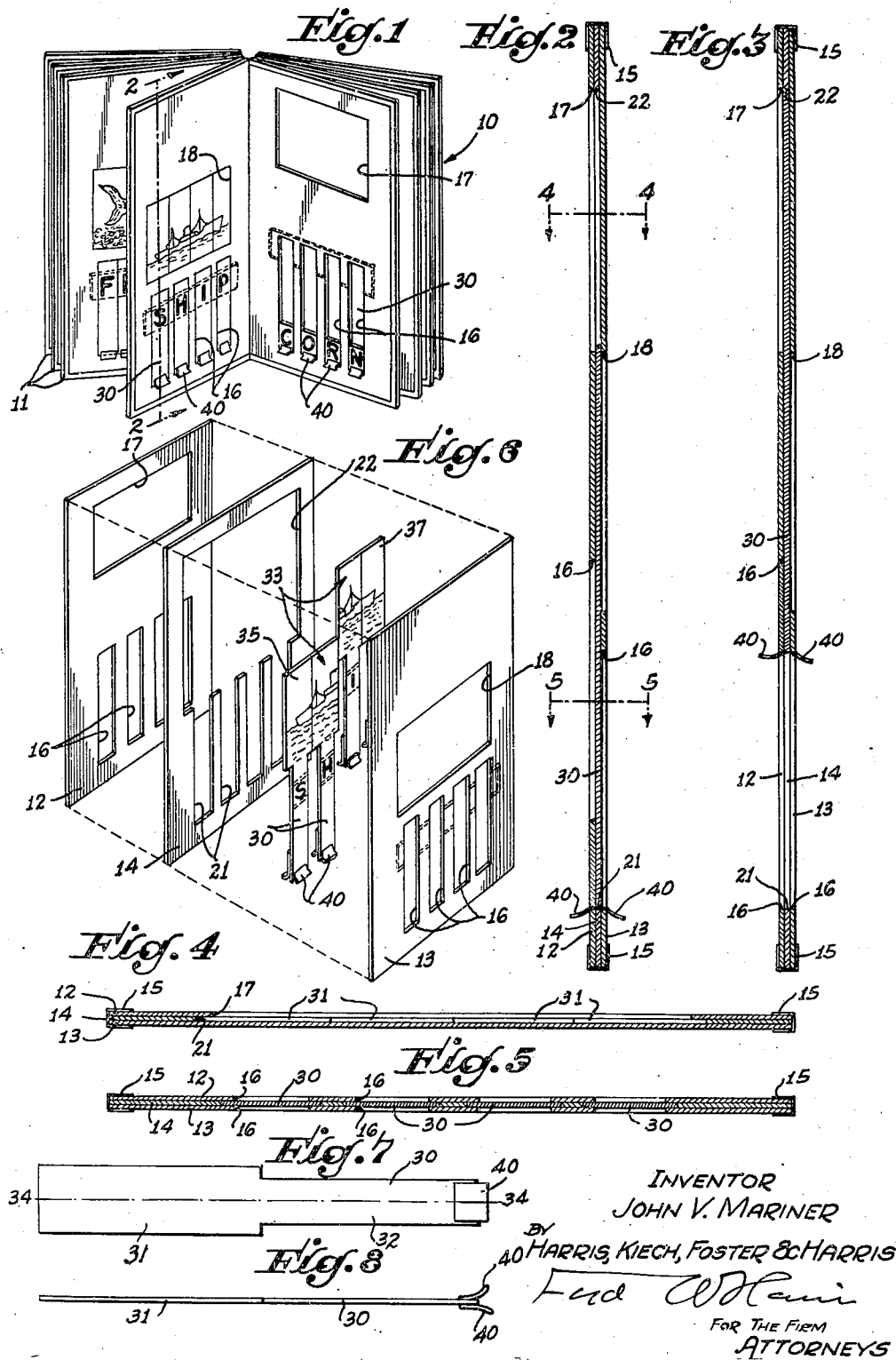
INVENTOR
JOHN V. MARINER
BY HARRIS, KIECH, FOSTER & HARRIS
FOR THE FIRM
ATTORNEYS Patented July 26, 1949

2,477,134

UNITED STATES PATENT OFFICE 2,477,134

EDUCATIONAL DEVICE

John V. Mariner, Los Angeles, Calif.

Application August 13, 1945, Serial No. 610,433

8 Claims. (Cl. 35—35)

My invention is directed generally to educational devices for spelling and reading, and more particularly to educational devices appealing to children.

It is well known from experiments in the psychology of education that with most people visual education is dependably successful and is more likely to make a lasting impression on the memory than almost any other method of teaching. Another reasonably dependable method of teaching subsists in manual education. Actual handling of a mechanism to be understood, or the handling of an illustrative representation thereof, promotes learning and holds interest.

It is a primary object of my invention to provide a means for teaching spelling and reading which employs the devices of both visual and manual education.

Where children are to be taught, it is often found desirable to resort to still simpler appeals, or to add such appeals as color, contrasts, and the appeal of tangible achievement to otherwise routine methods.

It is an object of my invention to provide a means where color may well aid in a pictorial representation, and where contrasts in color, or size, or disposition on a page, may be of value.

It is another object of my invention to provide means whereby a child may at least subconsciously identify a word with a picture of the object it represents.

It is another object of my invention to provide a means whereby a child in the process of learning may see for himself what he has accomplished, step by step.

If a child is to handle a teaching device himself and is to have such a device at his personal disposal, it is desirable that the device be of substantially rugged construction. It is a further object of my invention to provide a teaching means which will resist childish destruction, playful or deliberate, and will be adequately durable for the span of its useful life.

Further objects and advantages of my invention will be manifest hereinafter.

For the purpose of the present disclosure I shall describe an exemplary embodiment of my invention, but I do not intend to be limited to the design or operation thereof as herein described. Referring to the accompanying drawing, which is for illustrative purposes only, Fig. 1 is an elevational view in perspective of the device of the invention;

Fig. 2 is a longitudinal section through the line 2—2 of Fig. 1;

Fig. 3 is a view as in Fig. 2, showing an alternative position of the components thereof relative to each other;

Fig. 4 is a transverse section of the device of the invention through the line 4—4 of Fig. 2;

Fig. 5 is a view as in Fig. 4, through the line 5—5 of Fig. 2;

Fig. 6 is an exploded view in perspective of the device of the invention, showing an embodiment thereof in disassembly;

Fig. 7 is a plan view of one of the strips; and

Fig. 8 is an edge view of this strip.

My invention in the form shown comprises a book, generally designated by the numeral 10, which includes a plurality of pages 11 which are similar to each other in form but which relate to different words and pictures, each page being designed to teach the user to properly connect a word with a picture. Each page consists of an outer lamination 12, an outer lamination 13, and an intermediate lamination 14 which is sandwiched between the outer laminations 12 and 13. The laminations are fastened together to form a single page by any suitable means, such as, for example, an edge binding 15.

The outer lamination 12 has an opening 17 below which are four slots 16, and the outer lamination 13 has an opening 18 below which are four slots 16. When a page 11 is assembled, each slot 16 in the outer lamination 12 registers with a similar slot 16 in the outer lamination 13, but the openings 17 and 18 do not register with each other, the opening 18 being below and out of registry with the opening 17.

Each intermediate lamination 14 is provided with four slots 21, each of the slots 21 being a little wider than the slots 16 and so placed that the vertical center lines thereof register with the vertical center lines of the slots 16. The slots 21 are connected with an opening 22 which is a little wider than the openings 17 and 18, the vertical center line of the opening 22 registering with the vertical center lines of the openings 17 and 18 when the page 11 is assembled. The opening 17 registers with the top of the opening 22, and the opening 18 registers with the bottom of the opening 22.

Sliding in the slots 21 of the intermediate lamination 14 of each page 11 are strips 30 formed of a material of about the same thickness as the lamination 14. The strips consist of an upper portion 31 and a lower portion 32. The lower portion 32 is slightly narrower than the slots 21, and the upper portion is sufficiently wide to form a continuous surface visible through the openings 17 and 18 when the strips 30 are properly positioned as hereinafter explained, the openings 17 and 18 forming windows through which these surfaces may be viewed. The two inner strips 33 of each set of four strips are symmetrical about their major axis 34. While I have shown four strips 30 as constituting a set, and this number of strips enables the meaning of words of four letters or less to be taught using only one letter to a strip, either more or less strips may be used in each set.

The purpose of each set of strips is to indicate visually the correlation between a word and the meaning of the word by a picture illustrating this meaning. The pictures appear through the windows 17 and 18 when the strips 30 are in proper registry with each other and with these windows, the pictures being on the upper portion 31 of the strips 30. The letters are on the lower portion 32 of the strips 30 and are at all times visible through the slots 16. The picture on one side of the strips 30 can be seen when in proper registry through the window 18 of the page carrying the picture, and the picture on the reverse side of the strips 30 can be seen when the strips are in proper position through the window 17 in the reverse side of that page. When the picture on one side of the strips is properly registered with one of the windows, the picture on the reverse side of the strips is not visible. When the strips 30 are in their lower position, one picture is visible through the window 18, as shown in Fig. 1, but the picture on the reverse side is not visible through the upper window 17, as shown in that figure, although the letters forming the word to be associated with the last-named picture can be seen through the slots 16. The user, observing the word "Corn" as shown in Fig. 1, can find out what this word means by moving all the strips 30 upwardly by means of tabs 40. In so doing, he moves the picture on the reverse side of the strips out of registry with the window 18.

In practice the book is given to the user with all the pictures on the right-hand pages of the book hidden, that is, with all the strips 30 in their lower position. When the user moves the strips up to exhibit the picture on a right-hand page, he hides the picture on the succeeding left-hand page so that when he turns the page the pictures on both the left-hand and right-hand pages of the book as open before him are hidden. If now he moves the strips 30 down to exhibit the picture on the left-hand page, he puts that page back into its original condition, and when he finishes the book it is ready for another cycle of use.

I claim as my invention:

1. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position.

2. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, one side of each of said strips bearing a portion of a picture, and the other side of each of said strips bearing a portion of another picture, each of these pictures being complete when said strips are positioned in proper relationship with each other.

3. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, each of said outer laminations having a series of slots therein, the slots in each outer lamination each registering with one of said strips, so that each of said strips may be actuated through its respective slot in each of said outer laminations.

4. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, one side of each of said strips bearing a portion of a picture, and the other side of each of said strips bearing a portion of another picture, each of these pictures being complete when said strips are positioned in proper relationship with each other, each of said outer laminations having a series of slots therein, the slots in each outer lamination each registering with one of said strips, so that each of said strips may be actuated through its respective slot in each of said outer laminations.

5. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, each of said outer laminations having a series of slots therein, the slots in each outer lamination each registering with one of said strips, so that each of said strips may be actuated through its respective slot in each of said outer laminations, each of said strips carrying a letter and a portion of a picture on each side thereof, said letters being visible through said slots, all the letters on one side of said strips forming a word when said strips are positioned so as to form a picture.

6. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, one side of each of said strips bearing a portion of a picture, and the other side of each of said strips bearing a portion of another picture, each of these pictures being complete when said strips are positioned in proper relationship with each other, each of said outer laminations having a series of slots therein, the slots in each outer lamination each registering with one of said strips, so that each of said strips may be actuated through its respective slot in each of said outer laminations, each of said strips carrying a letter and a portion of a picture on each side thereof, said letters being visible through said slots, all the letter on one side of said strips forming a word when said strips are positioned so as to form a picture.

7. An educational device comprising: a first outer lamination; a second outer lamination; an intermediate lamination, said laminations being secured together with the intermedaite lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, each of said outer laminations having a series of slots therein, the slots in each outer lamination each registering with one of said strips, so that each of said strips may be actuated through its respective slot in each of said outer laminations, each of said strips carrying a letter and a portion of a picture on each side thereof, said letters being visible through said slots, all the letters on one side of said strips forming a word when said strips are positioned so as to form a picture, each of said words having some logical relationship with the picture appearing on the same side of said strips.

8. An educational device comprising: a first outer lamination; a second outer lamination; an intermediate lamination, said laminations being secured together with the intermediate lamination between said outer laminations, said intermediate lamination having a space therein, said first outer lamination having a first window formed therein registering with the upper portion of said space, and said second outer lamination having a second window formed therein registering with the lower portion of said space, said windows being out of registry with each other; and a series of strips sliding in said space from a first position, in which a portion of one side of said strips is visible through said first window, to a second position, in which said portion is not visible through said window, the reverse side of said strips not being visible through said second window when said strips are in said first position but being visible through said second window when said strips are in said second position, one side of each of said strips bearing a portion of a picture, and the other side of each of said strips bearing a portion of another picture, each of these pictures being complete when said strips are positioned in proper relationship with each other, each of said outer laminations having a series of slots therein, the slots in each outer lamination each registering with one of said strips, so that each of said strips may be actuated through its respective slot in each of said outer laminations, each of said strips carrying a letter on each side thereof, said letters being visible through said slots, all the letters on one side of said strips forming a word when said strips are positioned so as to form a picture, each of said words having some logical relationship with the picture appearing on the same side of said strips.

JOHN V. MARINER.

REFERENCES CITED

The following references are of record in the file of this patent:

UNITED STATES PATENTS

| Number | Name | Date |
|---|---|---|
| 556,467 | Koerner | Mar. 17, 1896 |
| 698,603 | Wiederseim | Apr. 29, 1902 |
| 845,798 | Leer | Mar. 5, 1907 |
| 1,120,681 | Browning | Dec. 15, 1914 |
| 1,405,193 | Favrean | Jan. 31, 1922 |
| 1,521,491 | Walker | Dec. 30, 1924 |
| 1,525,342 | Van Order | Feb. 3, 1925 |
| 1,582,810 | Whitehead | Apr. 27, 1926 |
| 1,902,971 | Rippon | Mar. 28, 1933 |
| 2,022,627 | Whitney | Nov. 26, 1935 |
| 2,066,861 | Wolfe | Jan. 5, 1937 |
| 2,127,805 | Battle | Aug. 23, 1938 |